US 8,576,939 B2

(12) United States Patent
Kim et al.

(10) Patent No.: US 8,576,939 B2
(45) Date of Patent: Nov. 5, 2013

(54) METHOD AND SYSTEM FOR SLICING A COMMUNICATION SIGNAL

(75) Inventors: Andrew Joo Kim, Atlanta, GA (US); Cattalen Pelard, Atlanta, GA (US); Edward Gebara, Atlanta, GA (US)

(73) Assignee: Quellan, Inc., Atlanta, GA (US)

( * ) Notice: Subject to any disclaimer, the term of this patent is extended or adjusted under 35 U.S.C. 154(b) by 507 days.

(21) Appl. No.: 12/578,869

(22) Filed: Oct. 14, 2009

(65) Prior Publication Data
US 2010/0027709 A1 Feb. 4, 2010

Related U.S. Application Data

(63) Continuation of application No. 11/022,112, filed on Dec. 22, 2004, now Pat. No. 7,616,700.

(60) Provisional application No. 60/531,901, filed on Dec. 22, 2003.

(51) Int. Cl.
*H04L 25/34* (2006.01)

(52) U.S. Cl.
USPC ............ 375/287; 375/232; 375/340; 375/233

(58) Field of Classification Search
USPC ......................................................... 375/287
See application file for complete search history.

(56) References Cited

U.S. PATENT DOCUMENTS

| 2,632,058 A | 3/1953 | Gray ............................... 178/15 |
| 3,445,771 A | 5/1969 | Clapham et al. ................ 325/42 |
| 3,571,725 A | 3/1971 | Kaneko et al. .................. 328/14 |
| 3,599,122 A | 8/1971 | Leutholki ........................ 333/29 |
| 3,633,108 A | 1/1972 | Kneuer ........................... 325/323 |
| 3,714,437 A | 1/1973 | Kinsel ............................ 359/185 |
| 3,806,915 A | 4/1974 | Higgins et al. ................ 340/347 |
| 3,977,795 A | 8/1976 | Buschmann ................... 356/256 |
| 4,201,909 A | 5/1980 | Dogliotti et al. .............. 455/608 |
| 4,287,756 A | 9/1981 | Gallagher .................. 73/61.1 R |

(Continued)

FOREIGN PATENT DOCUMENTS

| EP | 0 527 966 B1 | 9/1994 |
| EP | 0 584 865 B1 | 3/2000 |

(Continued)

OTHER PUBLICATIONS

André et al.; *InP DHBT Technology and Design Methodology for High-Bit-Rate Optical Communications Circuits*; IEEE Journal of Solid-State Circuits; vol. 33, No. 9, Sep. 1998; pp. 1328-1335.

(Continued)

*Primary Examiner* — Lihong Yu
(74) *Attorney, Agent, or Firm* — King & Spalding

(57) ABSTRACT

A slicer can receive a communication signal having a level or amplitude that is between two discrete levels of a multilevel digital communication scheme. The slicer can compare the communication signal to a plurality of references such that multiple comparisons proceed essentially in parallel. A summation node can add the results of the comparisons to provide an output signal set to one of the discrete levels. The slicer can process the communication signal and provide the output signal on a symbol-by-symbol basis. A decision feedback equalizer ("DFE") can comprise the slicer. A feedback circuit of the DFE can delay and scale the output signal and apply the delayed and scaled signal to the communication signal to reduce intersymbol interference ("ISI").

22 Claims, 7 Drawing Sheets

(56) References Cited

U.S. PATENT DOCUMENTS

| | | | |
|---|---|---|---|
| 4,288,872 A | 9/1981 | Tamburelli | 375/14 |
| 4,349,914 A | 9/1982 | Evans | 375/40 |
| 4,363,127 A | 12/1982 | Evans et al. | 375/30 |
| 4,386,339 A | 5/1983 | Henry et al. | 340/347 |
| 4,387,461 A | 6/1983 | Evans | 371/5 |
| 4,393,499 A | 7/1983 | Evans | 371/5 |
| 4,410,878 A | 10/1983 | Stach | 340/347 |
| 4,464,771 A | 8/1984 | Sorensen | 375/120 |
| 4,470,126 A | 9/1984 | Haque | 364/825 |
| 4,475,227 A | 10/1984 | Belfield | 381/30 |
| 4,479,266 A | 10/1984 | Eumurian et al. | 455/608 |
| 4,521,883 A | 6/1985 | Roché | 370/100 |
| 4,558,319 A * | 12/1985 | Shum | 340/870.09 |
| 4,580,263 A | 4/1986 | Watanabe et al. | 371/5 |
| 4,584,720 A | 4/1986 | Garrett | 455/608 |
| 4,602,374 A * | 7/1986 | Nakamura et al. | 375/287 |
| 4,618,941 A | 10/1986 | Linder et al. | 364/724 |
| 4,646,173 A | 2/1987 | Kammeyer et al. | 360/51 |
| 4,651,026 A | 3/1987 | Serfaty et al. | 307/269 |
| 4,751,497 A | 6/1988 | Torii | 340/347 |
| 4,830,493 A | 5/1989 | Giebeler | 356/328 |
| 4,847,521 A | 7/1989 | Huignard et al. | 307/425 |
| 4,864,590 A | 9/1989 | Arnon et al. | 375/14 |
| 4,868,773 A * | 9/1989 | Coyle et al. | 708/304 |
| 4,873,700 A | 10/1989 | Wong | 375/76 |
| 4,912,726 A | 3/1990 | Iwamatsu et al. | 375/20 |
| 4,942,593 A | 7/1990 | Whiteside et al. | 375/118 |
| 4,953,041 A | 8/1990 | Huber | 360/46 |
| 4,959,535 A | 9/1990 | Garrett | 250/214 R |
| 4,978,957 A | 12/1990 | Hotta et al. | 341/156 |
| 5,007,106 A | 4/1991 | Kahn et al. | 455/619 |
| 5,008,957 A | 4/1991 | Klyono | 455/618 |
| 5,012,475 A | 4/1991 | Campbell | 372/29 |
| 5,067,126 A | 11/1991 | Moore | 370/112 |
| 5,072,221 A | 12/1991 | Schmidt | 341/159 |
| 5,111,065 A | 5/1992 | Roberge | 307/270 |
| 5,113,278 A | 5/1992 | Degura et al. | 359/154 |
| 5,115,450 A | 5/1992 | Arcuri | 375/7 |
| 5,121,411 A | 6/1992 | Fluharty | 375/20 |
| 5,128,790 A | 7/1992 | Heidemann et al. | 359/132 |
| 5,132,639 A | 7/1992 | Blauvelt et al. | 330/149 |
| 5,151,698 A | 9/1992 | Pophillat | 341/52 |
| 5,181,034 A | 1/1993 | Takakura et al. | 341/144 |
| 5,181,136 A | 1/1993 | Kavehrad et al. | 359/190 |
| 5,184,131 A | 2/1993 | Ikeda | 341/165 |
| 5,208,833 A | 5/1993 | Erhart et al. | 375/20 |
| 5,222,103 A | 6/1993 | Gross | 375/54 |
| 5,223,834 A | 6/1993 | Wang et al. | 341/136 |
| 5,225,798 A | 7/1993 | Hunsinger et al. | 333/165 |
| 5,237,590 A | 8/1993 | Kazawa et al. | 375/20 |
| 5,243,613 A | 9/1993 | Gysel et al. | 372/26 |
| 5,252,930 A | 10/1993 | Blauvelt | 330/149 |
| 5,282,072 A | 1/1994 | Nazarathy et al. | 359/157 |
| 5,283,679 A | 2/1994 | Wedding | 359/154 |
| 5,291,031 A | 3/1994 | MacDonald et al. | 250/577 |
| 5,293,406 A | 3/1994 | Suzuki | 375/59 |
| 5,300,930 A | 4/1994 | Burger et al. | 341/96 |
| 5,321,543 A | 6/1994 | Huber | 359/187 |
| 5,321,710 A | 6/1994 | Cornish et al. | 372/26 |
| 5,327,279 A | 7/1994 | Farina et al. | 359/180 |
| 5,343,322 A | 8/1994 | Pirio et al. | 359/173 |
| 5,351,148 A | 9/1994 | Maeda et al. | 359/124 |
| 5,355,240 A | 10/1994 | Prigent et al. | 359/161 |
| 5,361,156 A | 11/1994 | Pidgeon | 359/161 |
| 5,371,625 A | 12/1994 | Wedding et al. | 319/173 |
| 5,373,384 A | 12/1994 | Hebert | 359/161 |
| 5,376,786 A | 12/1994 | MacDonald | 250/227.12 |
| 5,382,955 A | 1/1995 | Knierim | 341/64 |
| 5,387,887 A | 2/1995 | Zimmerman et al. | 333/166 |
| 5,408,485 A | 4/1995 | Ries | 372/38 |
| 5,413,047 A | 5/1995 | Evans et al. | 102/302 |
| 5,416,628 A | 5/1995 | Betti et al. | 359/181 |
| 5,418,637 A | 5/1995 | Kuo | 359/161 |
| 5,424,680 A | 6/1995 | Nazarathy et al. | 330/149 |
| 5,428,643 A | 6/1995 | Razzell | 375/308 |
| 5,428,831 A | 6/1995 | Monzello et al. | 455/296 |
| 5,436,752 A | 7/1995 | Wedding | 359/195 |
| 5,436,756 A | 7/1995 | Knox et al. | 359/260 |
| 5,444,864 A | 8/1995 | Smith | 455/84 |
| 5,450,044 A | 9/1995 | Hulick | 332/103 |
| 5,451,839 A * | 9/1995 | Rappaport et al. | 375/224 |
| 5,481,389 A | 1/1996 | Pidgeon et al. | 359/161 |
| 5,481,568 A | 1/1996 | Yada | 375/340 |
| 5,483,552 A | 1/1996 | Shimazaki et al. | 375/233 |
| 5,504,633 A | 4/1996 | Van Den Enden | 360/65 |
| 5,510,919 A | 4/1996 | Wedding | 359/115 |
| 5,515,196 A | 5/1996 | Kitajima et al. | 359/180 |
| 5,528,710 A | 6/1996 | Burton et al. | 385/16 |
| 5,541,955 A | 7/1996 | Jacobsmeyer | 375/222 |
| 5,548,253 A | 8/1996 | Durrant | 332/103 |
| 5,557,439 A | 9/1996 | Alexander et al. | 359/130 |
| 5,574,743 A | 11/1996 | van der Poel et al. | 372/46 |
| 5,574,978 A | 11/1996 | Talwar et al. | |
| 5,589,786 A | 12/1996 | Bella et al. | 327/108 |
| 5,604,724 A | 2/1997 | Shiokawa | 369/59.22 |
| 5,606,734 A | 2/1997 | Bahu | 455/303 |
| 5,612,653 A | 3/1997 | Dodds et al. | 333/124 |
| 5,617,135 A | 4/1997 | Noda et al. | 348/12 |
| 5,621,764 A | 4/1997 | Ushirokawa et al. | 375/317 |
| 5,625,360 A | 4/1997 | Garrity et al. | 341/144 |
| 5,625,722 A | 4/1997 | Froberg et al. | 385/1 |
| 5,644,325 A | 7/1997 | King et al. | 345/20 |
| 5,648,987 A | 7/1997 | Yang et al. | 375/232 |
| 5,670,871 A | 9/1997 | Man et al. | 324/96 |
| 5,675,600 A | 10/1997 | Yamamoto | 372/38 |
| 5,678,198 A | 10/1997 | Lemson | 455/67.1 |
| 5,689,356 A | 11/1997 | Rainal | 359/181 |
| 5,691,978 A | 11/1997 | Kenworthy | 370/278 |
| 5,692,011 A | 11/1997 | Nobakht et al. | 375/233 |
| 5,699,022 A | 12/1997 | Tovar | 333/18 |
| 5,706,008 A | 1/1998 | Huntley, Jr. et al. | 341/156 |
| 5,721,315 A | 2/1998 | Evans et al. | 525/74 |
| 5,723,176 A | 3/1998 | Keyworth et al. | 427/163.2 |
| 5,751,726 A | 5/1998 | Kim | 371/6 |
| 5,754,681 A | 5/1998 | Watanabe et al. | 382/159 |
| 5,757,763 A | 5/1998 | Green et al. | 369/275.3 |
| 5,761,243 A | 6/1998 | Russell et al. | 375/233 |
| 5,764,542 A | 6/1998 | Gaudette et al. | 364/574 |
| 5,774,505 A | 6/1998 | Baugh | 375/348 |
| 5,783,630 A | 7/1998 | Evans et al. | 525/74 |
| 5,784,032 A | 7/1998 | Johnston et al. | 343/702 |
| 5,790,595 A | 8/1998 | Benthin et al. | 375/224 |
| 5,798,854 A | 8/1998 | Blauvelt et al. | 359/161 |
| 5,801,657 A | 9/1998 | Fowler et al. | 341/155 |
| 5,802,089 A | 9/1998 | Link | 372/38 |
| 5,812,578 A | 9/1998 | Schemmann et al. | 372/46 |
| 5,825,211 A | 10/1998 | Smith et al. | 327/19 |
| 5,825,257 A | 10/1998 | Klymyshyn et al. | 332/100 |
| 5,825,825 A | 10/1998 | Altmann et al. | 375/293 |
| 5,828,329 A | 10/1998 | Burns | 341/155 |
| 5,835,848 A | 11/1998 | Bi et al. | 455/24 |
| 5,839,105 A | 11/1998 | Ostendorf et al. | 704/256 |
| 5,841,841 A | 11/1998 | Dodds et al. | 379/93.08 |
| 5,844,436 A | 12/1998 | Altmann | 327/156 |
| 5,848,139 A | 12/1998 | Grover | 379/114 |
| 5,850,409 A | 12/1998 | Link | 372/38 |
| 5,850,505 A | 12/1998 | Grover et al. | 395/182.02 |
| 5,852,389 A | 12/1998 | Kumar et al. | 332/103 |
| 5,859,862 A | 1/1999 | Hikasa et al. | 372/38 |
| 5,861,966 A | 1/1999 | Ortel | 351/125 |
| 5,872,468 A | 2/1999 | Dyke | 327/72 |
| 5,878,390 A | 3/1999 | Kawai et al. | 704/231 |
| 5,880,870 A | 3/1999 | Sieben et al. | 359/181 |
| 5,883,910 A | 3/1999 | Link | 372/38 |
| 5,887,022 A | 3/1999 | Lee et al. | 375/202 |
| 5,889,759 A | 3/1999 | McGibney | 370/207 |
| 5,896,392 A | 4/1999 | Ono et al. | 371/5.2 |
| 5,912,749 A | 6/1999 | Harstead et al. | 359/123 |
| 5,920,600 A | 7/1999 | Yamaoka et al. | 375/376 |
| 5,923,226 A | 7/1999 | Kakura et al. | 333/18 |
| 5,942,576 A | 8/1999 | Evans et al. | 525/73 |
| 5,943,380 A | 8/1999 | Marchesani et al. | 375/376 |
| 5,943,457 A | 8/1999 | Hayward et al. | 385/24 |
| 5,949,926 A | 9/1999 | Davies | 385/3 |

(56) References Cited

U.S. PATENT DOCUMENTS

| | | | |
|---|---|---|---|
| 5,959,032 A | 9/1999 | Evans et al. | 525/74 |
| 5,959,750 A | 9/1999 | Eskildsen et al. | 359/134 |
| 5,965,667 A | 10/1999 | Evans et al. | 525/74 |
| 5,968,198 A | 10/1999 | Hassan et al. | 714/752 |
| 5,978,417 A | 11/1999 | Baker et al. | 375/232 |
| 5,983,178 A | 11/1999 | Naito et al. | 704/245 |
| 5,985,999 A | 11/1999 | Dominguez et al. | 525/74 |
| 5,995,565 A | 11/1999 | Tong et al. | 375/346 |
| 5,999,300 A | 12/1999 | Davies et al. | 359/183 |
| 6,002,274 A | 12/1999 | Smith et al. | 327/19 |
| 6,002,717 A | 12/1999 | Gaudet | 375/232 |
| 6,009,424 A | 12/1999 | Lepage et al. | 707/6 |
| 6,011,952 A | 1/2000 | Dankberg et al. | 455/24 |
| 6,021,110 A | 2/2000 | McGibney | 370/208 |
| 6,028,658 A | 2/2000 | Hamada et al. | 352/129 |
| 6,031,048 A | 2/2000 | Evans et al. | 525/73 |
| 6,031,866 A | 2/2000 | Oler et al. | 375/219 |
| 6,031,874 A | 2/2000 | Chennakeshu et al. | 375/262 |
| 6,034,996 A | 3/2000 | Herzberg | 375/265 |
| 6,035,080 A | 3/2000 | Henry et al. | 385/24 |
| 6,041,299 A | 3/2000 | Schuster et al. | 704/232 |
| 6,052,420 A | 4/2000 | Yeap et al. | 375/346 |
| 6,072,364 A | 6/2000 | Jeckeln et al. | 330/149 |
| 6,072,615 A | 6/2000 | Mamyshev | 359/183 |
| 6,078,627 A | 6/2000 | Crayford | 375/286 |
| 6,084,931 A | 7/2000 | Powell, II et al. | 375/355 |
| 6,091,782 A | 7/2000 | Harano | 375/287 |
| 6,093,496 A | 7/2000 | Dominguez et al. | 428/500 |
| 6,093,773 A | 7/2000 | Evans et al. | 525/73 |
| 6,108,474 A | 8/2000 | Eggleton et al. | 385/122 |
| 6,111,477 A | 8/2000 | Klymyshyn et al. | 333/139 |
| 6,118,563 A | 9/2000 | Boskovic et al. | 359/124 |
| 6,118,567 A | 9/2000 | Alameh et al. | 359/189 |
| 6,127,480 A | 10/2000 | Dominguez et al. | 525/74 |
| 6,140,416 A | 10/2000 | Evans et al. | 525/74 |
| 6,140,858 A | 10/2000 | Dumont | 327/317 |
| 6,140,972 A | 10/2000 | Johnston et al. | 343/725 |
| 6,141,127 A | 10/2000 | Boivin et al. | 359/124 |
| 6,141,387 A | 10/2000 | Zhang | 375/261 |
| 6,148,428 A | 11/2000 | Welch et al. | 714/752 |
| 6,151,150 A | 11/2000 | Kikuchi | 359/194 |
| 6,154,301 A | 11/2000 | Harvey | 359/193 |
| 6,163,638 A | 12/2000 | Eggleton et al. | 385/37 |
| 6,169,764 B1 | 1/2001 | Babanezhad | 375/233 |
| 6,169,912 B1 | 1/2001 | Zuckerman | 455/570 |
| 6,181,454 B1 | 1/2001 | Nagahori et al. | 359/189 |
| 6,191,719 B1 | 2/2001 | Bult et al. | 341/144 |
| 6,201,916 B1 | 3/2001 | Eggleton et al. | 385/122 |
| 6,208,792 B1 | 3/2001 | Hwang et al. | 385/129 |
| 6,211,978 B1 | 4/2001 | Wojtunik | 359/174 |
| 6,212,654 B1 | 4/2001 | Lou et al. | 714/701 |
| 6,214,914 B1 | 4/2001 | Evans et al. | 524/323 |
| 6,215,812 B1 | 4/2001 | Young et al. | 375/144 |
| 6,219,633 B1 | 4/2001 | Lepage | 704/9 |
| 6,222,861 B1 | 4/2001 | Kuo et al. | 372/20 |
| 6,226,112 B1 | 5/2001 | Denk et al. | 359/138 |
| 6,236,963 B1 | 5/2001 | Naito et al. | 704/241 |
| 6,259,836 B1 | 7/2001 | Dodds | 385/24 |
| 6,259,847 B1 | 7/2001 | Lenz et al. | 385/131 |
| 6,268,816 B1 | 7/2001 | Bult et al. | 341/144 |
| 6,271,690 B1 | 8/2001 | Hirano et al. | 327/75 |
| 6,271,944 B1 | 8/2001 | Schemmann et al. | 359/124 |
| 6,281,824 B1 | 8/2001 | Masuda | 341/144 |
| 6,285,709 B1 | 9/2001 | Alelyunas et al. | 375/233 |
| 6,288,668 B1 | 9/2001 | Tsukamoto et al. | 341/172 |
| 6,289,055 B1 | 9/2001 | Knotz | 375/286 |
| 6,289,151 B1 | 9/2001 | Kazarinov et al. | 385/32 |
| 6,295,325 B1 | 9/2001 | Farrow et al. | 375/327 |
| 6,297,678 B1 | 10/2001 | Gholami | 327/198 |
| 6,298,459 B1 | 10/2001 | Tsukamoto | 714/746 |
| 6,304,199 B1 | 10/2001 | Fang et al. | 341/118 |
| 6,311,045 B1 | 10/2001 | Domokos | 455/78 |
| 6,313,713 B1 | 11/2001 | Ho et al. | 333/1.1 |
| 6,314,147 B1 | 11/2001 | Liang et al. | 375/346 |
| 6,317,247 B1 | 11/2001 | Yang et al. | 359/245 |
| 6,317,469 B1 | 11/2001 | Herbert | 375/293 |
| 6,341,023 B1 | 1/2002 | Puc | 359/124 |
| 6,356,374 B1 | 3/2002 | Farhan | 359/180 |
| 6,388,786 B1 | 5/2002 | Ono et al. | 359/181 |
| 6,411,117 B1 | 6/2002 | Hatamian | 324/765 |
| 6,421,155 B1 | 7/2002 | Yano | 359/181 |
| 6,445,476 B1 | 9/2002 | Kahn et al. | 359/184 |
| 6,473,131 B1 | 10/2002 | Neugebauer et al. | 348/572 |
| 6,501,792 B2 | 12/2002 | Webster | 375/232 |
| 6,539,204 B1 | 3/2003 | Marsh et al. | 455/63 |
| 6,560,257 B1 | 5/2003 | DeSalvo et al. | 372/38.02 |
| 6,650,189 B1 | 11/2003 | Romao | |
| 6,665,348 B1 | 12/2003 | Feher | 375/259 |
| 6,665,500 B2 | 12/2003 | Snawerdt | 398/185 |
| 6,718,138 B1 | 4/2004 | Sugawara | 398/9 |
| 6,751,587 B2 | 6/2004 | Thyssen et al. | 704/228 |
| 6,816,101 B2 | 11/2004 | Hietala et al. | 341/155 |
| 6,819,166 B1 | 11/2004 | Choi et al. | 327/551 |
| 6,819,943 B2 | 11/2004 | Dalal | |
| 6,920,315 B1 | 7/2005 | Wilcox et al. | |
| 6,961,019 B1 | 11/2005 | McConnell et al. | 342/357.1 |
| 7,016,406 B1 * | 3/2006 | Phanse et al. | 375/232 |
| 7,035,361 B2 | 4/2006 | Kim et al. | 375/350 |
| 7,050,388 B2 | 5/2006 | Kim et al. | 370/201 |
| 7,123,676 B2 | 10/2006 | Gebara et al. | |
| 7,149,256 B2 | 12/2006 | Vrazel et al. | |
| 7,173,551 B2 | 2/2007 | Vrazel et al. | |
| 7,190,742 B2 | 3/2007 | Popescu et al. | 375/326 |
| 7,212,580 B2 | 5/2007 | Hietala et al. | |
| 7,215,721 B2 | 5/2007 | Hietala et al. | |
| 7,263,122 B2 * | 8/2007 | Stonick et al. | 375/232 |
| 7,307,569 B2 | 12/2007 | Vrazel et al. | |
| 2001/0024542 A1 | 9/2001 | Aina et al. | 385/24 |
| 2002/0086640 A1 | 7/2002 | Belcher et al. | 455/63 |
| 2002/0196508 A1 | 12/2002 | Wei et al. | 359/183 |
| 2003/0002121 A1 | 1/2003 | Miyamoto et al. | 359/183 |
| 2003/0007631 A1 | 1/2003 | Bolognesi et al. | |
| 2003/0008628 A1 | 1/2003 | Lindell et al. | 455/180.1 |
| 2003/0030876 A1 | 2/2003 | Takei | 359/187 |
| 2003/0053534 A1 | 3/2003 | Sivadas et al. | 375/229 |
| 2003/0058976 A1 | 3/2003 | Ohta et al. | 375/350 |
| 2003/0063354 A1 | 4/2003 | Davidson | 359/189 |
| 2003/0067990 A1 | 4/2003 | Bryant | 375/259 |
| 2004/0053578 A1 | 3/2004 | Grabon et al. | |
| 2004/0105462 A1 | 6/2004 | Kim et al. | |
| 2004/0114888 A1 | 6/2004 | Rich et al. | |
| 2004/0197103 A1 | 10/2004 | Roberts et al. | 398/159 |
| 2004/0213354 A1 | 10/2004 | Jones et al. | 375/285 |
| 2004/0218756 A1 | 11/2004 | Tang et al. | 379/417 |
| 2005/0069063 A1 | 3/2005 | Waltho et al. | 375/346 |
| 2006/0146966 A1 | 7/2006 | Golanbari et al. | |
| 2006/0159002 A1 | 7/2006 | Kim et al. | |
| 2006/0178157 A1 | 8/2006 | Gebara et al. | |
| 2006/0291598 A1 | 12/2006 | Gebara et al. | |
| 2007/0060059 A1 | 3/2007 | Kim et al. | |
| 2007/0064923 A1 | 3/2007 | Schmukler et al. | |
| 2007/0092265 A1 | 4/2007 | Vrazel et al. | |
| 2007/0171998 A1 | 7/2007 | Hietala et al. | |
| 2007/0253495 A1 | 11/2007 | Kim | |

FOREIGN PATENT DOCUMENTS

| | | |
|---|---|---|
| GB | 2 223 369 A | 4/1990 |
| GB | 2 306 066 A | 4/1997 |
| JP | 62082659 | 10/1988 |
| JP | 1990000063162 | 11/1991 |
| JP | 04187738 | 7/1992 |
| JP | 08079186 A | 3/1996 |
| WO | WO 99/45683 A1 | 9/1999 |
| WO | WO 01/41346 A2 | 6/2001 |
| WO | WO 02/067521 A1 | 8/2002 |
| WO | WO 02/082694 A1 | 10/2002 |
| WO | WO 02/091600 A2 | 11/2002 |
| WO | WO 03/071731 A1 | 8/2003 |
| WO | WO 03/077423 A2 | 9/2003 |
| WO | WO 03/092237 A1 | 11/2003 |
| WO | WO 2004/008782 A2 | 1/2004 |
| WO | WO 2004/045078 A2 | 5/2004 |
| WO | WO 2004/088857 A2 | 10/2004 |

(56) References Cited

FOREIGN PATENT DOCUMENTS

| WO | WO 2005/018134 A2 | 2/2005 |
|---|---|---|
| WO | WO 2005/050896 A2 | 6/2005 |
| WO | WO/2006/065883 A2 | 6/2006 |

OTHER PUBLICATIONS

Borjak et al.; *High-Speed Generalized Distributed-Amplifier-Based Transversal-Filter Topology for Optical Communication Systems*; IEEE Transactions on Microwave Theory and Techniques; vol. 45, No. 8; Aug. 1997; pp. 1453-1457.

Buchali et al.; *Fast Eye Monitor for 10 Gbit/s and its Application for Optical PMD Compensation*; Optical Society of America; (2000); pp. TuP5-1-TuP1-3.

Cartledge et al.; *Performance of Smart Lightwave Receivers With Linear Equalization*; Journal of Lightwave Technology; vol. 10, No. 8; Aug. 1992; pp. 1105-1109.

Chi et al.; *Transmission Performance of All-Optically Labelled Packets Using ASK/DPSK Orthogonal Modulation*; The 15$^{th}$ Annual Meeting of the IEEE Lasers and Electro-Optics Society, 2002; LEOS 2002; Nov. 10-14, 2002; vol. 1:51-52. The whole document.

Chiang et al.; *Implementation of STARNET: A WDM Computer Communications Network*; IEEE Journal on Selected Areas in Communications; Jun. 1996; vol. 14, No. 5; pp. 824-839.

Choi et al.; *A 0.18-µm CMOS 3.5-Gb/s Continuous-Time Adaptive Cable Equalizer Using Enhanced Low-Frequency Gain Control Method*; IEEE Journal of Solid-State Circuits; Mar. 2004; vol. 39, No. 3; pp. 419-425.

Cimini et al.; *Can Multilevel Signaling Improve the Spectral Efficiency of ASK Optical FDM Systems?*; IEEE Transactions on Communications; vol. 41, No. 7; Jul. 1993; pp. 1084-1090.

Downie et al.; *Performance Monitoring of Optical Networks with Synchronous and Asynchronous Sampling*; Corning Incorporated, Science and Technology; SP-AR-02-1; p. WDD50-1; Abstract.

Enning et al.; *Design and Test of Novel Integrate and Dump Filter (I&D) for Optical Gbit/s System Applications*; Electronics Letters; (Nov. 21, 1991); vol. 27, No. 24; pp. 2286-2288.

Fürst et al.; *Performance Limits of Nonlinear RZ and NRZ Coded Transmission at 10 and 40 Gb/s on Different Fibers*; pp. 302-304.

Garrett, Ian; *Pulse-Position Modulation for Transmission Over Optical Fibers with Direct or Heterodyne Detection*; IEEE Transactions on Communications; vol. COM-31; No. 4; Apr. 1983; pp. 518-527.

Godin et al.; *A InP DHBT Technology for High Bit-rate Optical Communications Circuits*; IEEE; (1997); pp. 219-222.

Haskins et al.; *FET Diode Linearizer Optimization for Amplifier Predistortion in Digital Radios*; IEEE Microwave and Guided Wave Letters; vol. 10, No. 1; Jan. 2000; pp. 21-23.

Hranilovic et al.; *A Multilevel Modulation Scheme for High-Speed Wireless Infrared Communications*; IEEE; (1999); pp. VI-338-VI-341.

Idler et al.; *40 Gbit/s Quaternary Dispersion Supported Transmission Field Trial Over 86 km Standard Singlemode Fibre*; 24$^{th}$ European Conference on Optical Communication; Sep. 1998; pp. 145-147.

Jutzi, Wilhelm; *Microwave Bandwidth Active Transversal Filter Concept with MESFETs*; IEEE Transactions on Microwave Theory and Technique, vol. MTT-19, No. 9; Sep. 1971; pp. 760-767.

Kaess et al.; *New Encoding Scheme for High-Speed Flash ADC's*; IEEE International Symposium on Circuits and Systems; Jun. 9-12, 1997; Hong Kong; pp. 5-8.

Kaiser et al.; *Reduced Complexity Optical Duobinary 10-Gb/s Transmitter Setup Resulting in an Increased Transmission Distance*; IEEE Photonics Technology Letters; Aug. 2001; vol. 13; No. 8; pp. 884-886.

Lee et al.; *Effects of Decision Ambiguity Level on Optical Receiver Sensitivity*; IEEE Photonics Technology Letters; vol. 7, No. 19; Oct. 1995; pp. 1204-1206.

Marcuse, Dietrich; *Calculation of Bit-Error Probability for a Lightwave System with Optical Amplifiers and Post-Detection Gaussian Noise*; Journal of Lightwave Technology; vol. 9, No. 4; Apr. 1991; pp. 505-513.

Megherbi et al.; *A GaAs-HBT A/D Gray-Code Converter*; IEEE; (1997); pp. 209-212.

Nazarathy et al.; *Progress in Externally Modulated AM CATV Transmission Systems*; Journal of Lightwave Technology; vol. 11, No. 1; Jan. 1993; pp. 82-105.

Oehler et al.; *A 3.6 Gigasample/s 5 bit Analog to Digital Converter Using 0.3 µm AlGaAs-HEMT Technology*; IEEE; (1993); pp. 163-164.

Ohm et al.; *Quaternary Optical ASL-DPSK and Receivers with Direct Detection*; IEEE Photonics Technology Letters; Jan. 2003; vol. 15, No. 1; pp. 159-161.

Ohtsuki et al.; *BER Performance of Turbo-Coded PPM CDMA Systems on Optical Fiber*; Journal of Lightwave Technology; vol. 18; No. 12; Dec. 2000; pp. 1776-1784.

Ota et al.; *High-Speed, Burst-Mode, Packet-Capable Optical Receiver and Instantaneous Clock Recovery for Optical Bus Operation*; Journal of Lightwave Technology; vol. 12, No. 2; Feb. 1994; pp. 325-331.

Paul, et al.; *3 Gbit/s Optically Preamplified Direct Detection DPSK Receiver With 116 photon/bit Sensitivity*; Electronics Letters; vol. 29, No. 7; Apr. 1, 1993; pp. 614-615.

Penninckx et al.; *Optical Differential Phase Shift Keying (DPSK) Direct Detection Considered as a Duobinary Signal*; Proc. 27$^{th}$ Eur. Conf. on Opt. Comm. (ECOC'01—Amsterdam); vol. 3; Sep. 30 to Oct. 4, 2001; pp. 456-457.

Poulton et al.; *An 8-GSa/s 8-bit ADC System*; Symposium on VLSI Circuits Digest of Technical Papers; (1997); pp. 23-24.

Poulton et al.; *A 6-b, 4 GSa/s GaAs HBT ADC*; IEEE Journal of Solid-State Circuits; vol. 30, No. 10.; Oct. 1995; pp. 1109-1118.

Poulton et al.; *A 6-bit, 4 GSa/s ADC Fabricated in a GaAs HBT Process*; IEEE; (1994); pp. 240-243.

Prasetyo et al.; *Application for Amplitude Gain Estimation Techniques for Multilevel Modulation in OFDM Systems*; IEEE; (1998); pp. 821-824.

Rohde et al.; *Robustness of DPSK Direct Detection Transmission Format in Standard Fibre WDM Systems*; Electronics Letters; vol. 36, No. 17; Aug. 17, 2000; pp. 1483-1484.

Runge et al.; *High-Speed Circuits for Lightwave Communications*; 1999; World Scientific, pp. 181-184.

Shirasaki et al.; *Fibre Transmission Properties of Optical Pulses Produced Through Direct Phase Modulation of DFB Laser Diode*; Electronics Letters; vol. 24, No. 8; Apr. 14, 1988; pp. 486-488.

Shtaif et al.; *Limits on the Spectral Efficiency of Intensity Modulated Direct Detection Systems with Optical Amplifiers*; AT&T Labs Research; pp. MM1-1-MM1-3.

Su et al.; *Inherent Transmission Capacity Penalty of Burst-Mode Receiver for Optical Multiaccess Networks*; IEEE Photonics Technology Letters; vol. 6, No. 5; May 1994; pp. 664-667.

Vodhanel et al.; *Performance of Directly Modulated DFB Lasers in 10-Gb/s ASK, FSK, and DPSK Lightwave Systems*; Journal of Lightwave Technology; Sep. 1990; vol. 8, No. 9; pp. 1379-1386.

Vorenkamp et al.; *A 1Gs/s, 10b Digital-to-Analog Converter*; ISSCC94/Session 3/Analog Techniques/Paper WP 3.3; pp. 52-53.

Wakimoto et al.; *Si Bipolar 2-GHz 6-bit Flash A/D Conversion LSI*; IEEE Journal of Solid-State Circuits; Dec. 1988; vol. 23, No. 6; pp. 1345-1350.

Walkin et al.; *A 10 Gb/s 4-ary ASK Lightwave System*; ECOC; 1997; pp. 255-258.

Walklin et al.; *Multilevel Signaling for Extending the Dispersion-Limited Transmission Distance in High-Speed, Fiber Optic Communication Systems*; IEEE; 1996; pp. 233-236.

Walklin et al.; *Multilevel Signaling for Increasing the Reach of 10 Gb/s Lightwave Systems*; IEEE Journal of Lightwave Technology; vol. 17; No. 11; Nov. 1999; pp. 2235-2248.

Wang et al.; *Multi-Gb/s Silicon Bipolar Clock Recovery IC*; IEEE Journal on Selected Areas in Communications; vol. 9, No. 5; Jun. 1991; pp. 656-663.

Webb, William T.; *Spectrum Efficiency of Multilevel Modulation Schemes in Mobile Radio Communications*; IEEE Transactions on Communications; vol. 43, No. 8; Aug. 1995; pp. 2344-2349.

(56) References Cited

OTHER PUBLICATIONS

Wedding et al.; *Multi-Level Dispersion Supported Transmission at 20 Gbit/s Over 46 km Installed Standard Singlemode Fibre*; 22$^{nd}$ European Conference on Optical Communication; 1996; pp. 91-94.

Wedding et al.; *Fast Adaptive Control for Electronic Equalization of PMD*; Optical Society of America; (2000); pp. TuP4-1-TuP4-3.

Weger et al.; *Gilbert Multiplier as an Active Mixer with Conversion Gain Bandwidth of up to 17GHz*; Electronics Letters; Mar. 28, 1991; vol. 27, No. 7; pp. 570-571.

Westphal et al.; *Lightwave Communications*; 1994; Thursday Afternoon/CLEO '94; pp. 337-338.

Wilson et al.; *Predistortion of Electroabsorption Modulators for Analog CATV Systems at 1.55 μm*; Journal of Lightwave Technology; vol. 15, No. 9; Sep. 1997; pp. 1654-1662.

Author: Unknown; *Digital Carrier Modulation Schemes*; Title: Unknown; Date: Unknown; pp. 380-442.

Kannangara et al.; *Adaptive Duplexer for Multiband Transreceiver*; Radio and Wireless Conference; Aug. 10-13, 2003; RAWCON '03; pp. 381-384.

Kannangara et al.; *Adaptive Duplexer for Software Radio*; Approximate Date: Nov. 11-13, 2002.

Kannangara et al.; *An Algorithm to Use in Adaptive Wideband Duplexer for Software Radio*; IEICE Transactions on Communications; Dec. 2003; vol. E86-B, No. 12; pp. 3452-3455.

Kannangara et al.; *Performance Analysis of the Cancellation Unit in an Adaptive Wideband Duplexer for Software Radio*; ATcrc Telecommunications and Networking Conference & Workshop, Melbourne, Australia, Dec. 11-12, 2003.

Williamson et al., *Performance Analysis of Adaptive Wideband Duplexer*; 2003 Australian Telecommunications, Networks and Applications Conference (ATNAC); Dec. 8-10, 2003.

\* cited by examiner

Conventional Decision Feedback Equalizer ("DFE")

Conventional DFE Feedback Loop

METHOD AND SYSTEM FOR SLICING A COMMUNICATION SIGNAL

CROSS REFERENCE TO RELATED APPLICATIONS

This application is a continuation of and claims priority to U.S. Nonprovisional patent application Ser. No. 11/022,112 filed Dec. 22, 2004 now U.S. Pat. No. 7,616,700 and entitled "Method and System for Slicing a Communication Signal," which claims the benefit of priority to U.S. Provisional Patent Application Ser. No. 60/531,901, entitled "Slicer Apparatus for High-Speed Multilevel Decision Feedback Equalization," and filed Dec. 22, 2003. The entire contents of each of the above-identified patent applications are hereby incorporated herein by reference.

This application is related to U.S. Pat. No. 6,816,101, assigned Nonprovisional patent application Ser. No. 10/383,703, entitled "High-Speed Analog-To-Digital Converter Using a Unique Gray Code," and filed on Mar. 7, 2003. The contents of U.S. Pat. No. 6,816,101 are hereby incorporated by reference.

FIELD OF THE INVENTION

The present invention relates to the field of data communications, and more specifically to processing a multilevel communication signal to reduce bit errors by suppressing interference, such as intersymbol interference, that occurs during signal propagation over a physical medium.

BACKGROUND

Digital communications involves conveying digital data by generating, sending, receiving, and processing analog waveforms. A transmitter accepts a sequence of digitally formatted data and converts the sequence into an analog waveform. Each time interval of this waveform carries or is encoded with an element of digital information referred to as a symbol. A one-to-one correspondence typically exists between each discrete waveform state and each symbol. That is, for the set of symbols that a communication system can convey, each symbol matches a specific signal level from two or more signal level possibilities. The transmitter outputs the waveform onto a medium or channel. The waveform transmits or propagates over the medium or channel to a receiver, which decodes or extracts the original data from the received waveform.

The transmitter generating the waveform sets the signal amplitude, phase, and/or frequency of the output waveform to one of N discrete values, levels, or states during the time interval to represent digital information. Binary signaling uses N=2 levels, with the levels corresponding to or representing "0" and "1". Multilevel signaling schemes can use more than two levels, i.e. N≥2, with the levels being "0", "1", . . . , "N−1". The transmitter transmits a signal level or symbol during a predetermined time period or interval called the symbol period and denoted as $T_0$. Thus, the transmitter conveys digital data to the receiver as a sequence of symbols, transmitting one symbol per symbol period.

On the opposite end of the communication link from the transmitter, the receiver decodes the digital information from the communicated analog waveform. That is, for each symbol, the transmitter determines or detects which of the levels was transmitted from the N possibilities. Thus, the receiver processes the incoming waveform to assign a symbol to each symbol period. If the symbol that the receiver assigns to the waveform is the same symbol that the transmitter used as the basis for modulating or generating the waveform, then the communication of that symbol succeeded, and that data element transmitted without error.

However, the transmission of data in a physical medium or communication channel is not always error free. The communicated signal can degrade during propagation resulting in data errors. In particular, the transmission channel or transmission medium can distort the waveforms via dispersion or other phenomena resulting in what is known as intersymbol interference ("ISI"). Noise or interference from external sources can also corrupt the signal during transmission, for example exacerbating ISI.

The term "intersymbol interference" or "ISI," as used herein, refers to signal interference stemming from the transfer of signal or waveform energy from one symbol period to another symbol period. ISI can appear as slight movements of a transmission signal in time or phase, also known as jitter or timing distortion, that may cause synchronization problems. ISI can result from temporal spreading and consequent overlapping of the pulses or waveform segments that occupy each symbol period. The severity of ISI can compromise the integrity of the received signal to the extent that the receiver does not reliably distinguish between the symbols in two adjacent symbol periods or otherwise misidentifies a symbol.

Signal distortion, as well as noise related to ISI and other interference sources, can lead to decoding errors. In some limited circumstances, conventional equalization techniques are available to reduce the incidence of data errors that ISI causes. The term "equalization," as used herein, refers to manipulating a communication signal in a manner that counteracts or otherwise compensates for signal changes that occur during transmission on a communication channel or medium.

Equalization can be viewed as an intentional "distortion," applied at either the receiving or the transmitting end of communication link, that counteracts detrimental distortion introduced by the channel. Unfortunately, many conventional equalization techniques (linear equalizers in particular) tend to exacerbate the effect of the noise. Thus, conventional equalizers are often limited in the magnitude of equalization that they can apply. Beyond a certain level of applied equalization, such equalizers can induce or amplify noise, thereby degrading communication integrity. An appropriately-set equalizer based on conventional technology is usually balanced to yield a favorable tradeoff between the amount of ISI removed and the amount of noise amplified.

Decision feedback equalization is a known equalization method that can be applied at the receive-end of a communications system. A decision feedback equalizer ("DFE") is a nonlinear equalizer intended to remove ISI without exacerbating the noise, thereby permitting a higher level of ISI cancellation and an improved equalized signal. The term "decision feedback equalizer" or "DFE," as used herein, refers to a device that suppresses ISI in a first time interval of a communication signal by generating a correction signal based on processing a second time interval of the communication signal and applying the correction signal to the first time interval of the communication signal.

FIG. 1 illustrates a functional block diagram of an exemplary conventional DFE 110. The DFE 110 takes as input the communicated signal $v_{rx}$ 120 and applies a corrective signal $v_{fb}$ 130 to suppress or remove ISI. The DFE 110 generates this corrective signal 130 via an internal feedback mechanism based on an arrangement of delay stages 170 and attenuators or amplifiers 180.

The compensated signal $v_{comp}$ 140 (i.e. received signal 120 plus the applied corrective signal 130) is quantized by the slicer 150 to one of the candidate N signal levels. Specifically, the slicer 150 takes as input a (potentially distorted) multi-level signal 140 and outputs a reconstructed or regenerated multilevel signal 160. The term "slicer," as used herein, refers to a device that processes an incoming analog signal and outputs a signal having a discrete characteristic that corresponds to at least one element of digital data. For example, a slicer 150 can slice, clip, or set the amplitude of a pulse to provide a resulting signal that has a specified amplitude.

For each symbol period, the slicer 150 sets or forces the signal level of its output 160 to the discrete level or state of the nearest valid symbol of the multilevel signal, thereby removing minor signal degradation. In other words, for each symbol period, the slicer 150 evaluates the incoming signal 140 and manipulates it to provide a discrete signal state that corresponds to one of the symbol possibilities. If the signal degradation is within a range of severities that the conventional DFE 110 can accommodate, the resulting symbol value output by the slicer 150 is the same as the symbol that was transmitted. In other words, within a limited level of signal degradation, the conventional DFE 110 removes noise or signal ambiguity to accurately reconstruct the signal output by the transmitter, thereby providing data transmission without error.

Since the slicer output $v_{out}$ 160 should nominally have the same level as the transmitted signal, the slicer output 160 can be delayed and scaled to model (and subsequently remove) the ISI that this symbol imposes on symbols yet to be received in the communicated waveform. That is, the conventional DFE 110 processes the waveform element in each symbol period based in part on the processing of earlier-received waveform elements.

Referring now to FIGS. 1 and 2, the illustrated conventional DFE 110 provides a plurality of feedback loops 210, each providing a delay $\delta_i$ (small letter "delta") and an amplification gain $\alpha_i$. Referring specifically to the feedback loop 210 identified in FIG. 2, the delay element 170a delays the quantized signal 160 by an amount of time $\delta_1$ such that the cumulative delay through (i) the slicer 150, (ii) the delay element 170a, (iii) the adjustable amplifier 180a, and (iv) the summation nodes 190a and 190b is equal to the symbol period $T_0$. The delay along this path 210 will be referred to as the primary loop delay $\Delta$ (capital letter "delta"). Through appropriate setting of the gain $\alpha_1$ on the adjustable amplifier 180a, the ISI from the immediately preceding symbol can be removed when $\Delta=T_0$. Referring now to FIGS. 1 and 2, in a similar fashion, setting the delay $\delta_k$ and gain $\alpha_k$ on subsequent stages or feedback paths of the DFE 110 can remove ISI from the symbols of other symbol periods.

Thus, the feed back loop 210 through amplifier 180a addresses ISI on a current symbol period resulting from a symbol transmitted in the immediately preceding symbol period. The feedback loop through amplifier 180b addresses ISI on the current symbol period resulting from a symbol transmitted during the time frame that is two symbol periods earlier. Likewise, the $K^{th}$ feedback loop through amplifier 180c addresses ISI on the current symbol period due to a symbol transmitted during the $K^{th}$ previous symbol period.

One problem with the conventional DFE 110 lies in implementation feasibility for high-speed multilevel systems with N>2. In these systems, it is often a challenge to build a slicer 150 with a propagation delay sufficiently small to meet the primary loop delay criterion $\Delta=T_0$. In certain conventional applications involving relatively slow data rates, conventional DFEs 110 may perform adequately. That is, the slicer propagation delay limitation that most conventional DFEs exhibit may not prevent adequate performance at slow or modest data rates. In particular, at low symbol rates (e.g. thousands or a few millions of symbols per second), the functionality illustrated in FIG. 1 could be realized by sampling the signal with an analog-to-digital converter ("ADC") and carrying out the DFE operations in a digital signal processor ("DSP").

However, conventional DFEs 110 are often inadequate for high-speed communication systems, (e.g. systems with symbol rates above 100 million bits per second or on the order of billions of symbols per seconds). It is often impractical to implement a conventional DFE 110 with an ADC and a DSP commensurate with the high symbol rate (i.e. small $T_0$ and hence stringent primary loop delay criterion).

For high-speed systems, conventional DFEs 110 have been built for binary (N=2 levels) systems based on fast integrated circuit ("IC") processes. With good IC design, the propagation delay criterion can be achieved because the slicer 150 (which is usually the most significant contributor to the first loop propagation delay $\Delta$) corresponds to a simple thresholding device that can be implemented with a small amount of circuitry. In particular, a single comparator or limiting amplifier can perform the slicing function for binary communication as known to those skilled in the art.

Problems can arise when attempting to use conventional technology to implementing a DFE 110 for a high-speed communication system that uses more than two communication signal levels (N>2) to convey data. One approach is to quantize the slicer input 120 by (i) applying an ADC to decode the signal value, followed by (ii) applying a digital-to-analog converter ("DAC") to regenerate the multilevel signal. This regeneration, however, is problematic because the propagation delay through the combination of the ADC and DAC usually exceeds the aforementioned time criteria for the primary loop 210.

Conventional attempts have been made to increase DFE performance by reducing propagation delay through aspects of the DFE 100 other than the slicer 150. That is, conventional technologies may quicken the computing of the amount of ISI compensation (i.e. $v_{fb}$ 130) based on the slicer output $v_{out}$ 160. However, conventional technologies generally fail to adequately shorten the total propagation delay of the primary feedback loop for high-speed multilevel communication. Thus, for many applications, the net delay of the conventional primary loop path 210, which includes the slicer delay, extends beyond the symbol period and thus is too lengthy. In other words, slow slicing often limits conventional DFEs 110 to addressing ISI on communication signals that convey data with two signal levels or with relatively slow data rates.

U.S. Pat. No. 5,594,756, entitled "Decision Feedback Equalization Circuit" proposes a DFE for high-speed communications systems. The disclosed technology attempts to address the difficulty of quickly estimating the feedback correction component from the slicer output. A disclosed feedback mechanism pre-computes correction components for each of the potential cases of transmitted symbols and uses a switch to select a specific one of these correction components for application. One shortcoming of the technology is that the slicer propagation delay, termed "DET" in that patent's disclosure, generally limits the slicer propagation delay to an unacceptably long time. Thus, for many high-speed applications, the technology of the '756 patent may be inadequate.

U.S. Pat. No. 6,047,026, entitled "Method and Apparatus for Automatic Equalization of Very High Frequency Multilevel and Baseband Codes Using a High Speed Analog Decision Feedback Equalizer," discloses another DFE approach. The '026 patent proposes a DFE structure utilizing positive and negative portions of slicer output pulses that feed into finite impulse response ("FIR") filters. The use of both positive and negative components purportedly allows operation at high frequencies in certain circumstances. This patent emphasizes achieving faster generation of the ISI corrective component but fails to disclose adequate slicer technology that provides sufficient speed for many applications. Despite improving the speed of the feedback loop in a DFE, the technology of the '026 patent supports symbol rates generally limited by the propagation delay of the slicer.

U.S. Pat. No. 6,198,420, entitled "Multiple Level Quantizer," proposes an ADC with automatic dark-level detection for optical communications contexts. The '420 patent discloses using a flash converter in a manner that can be inadequate for many high speed applications. The technology disclosed in the '420 patent is generally limited in its capability to adequately address propagation delay of an ADC. Further, that technology has limitations related to combining the functionality of a DAC and an ADC in a DFE. The disclosed latching mechanisms following each comparator can add significant propagation delay that may encumber the primary feedback loop with excessive aggregate delay. Latching mechanisms have been known to exhibit propagation delays that can exceed one half of the symbol period, for example. As discussed above, a DFE should regenerate multilevel signals (i.e. the function performed by the combination of the ADC and the DAC) in less time that the time span of a symbol period $T_0$. Thus, the technology of the '420 patent may not adequately support many high-speed applications involving multi-level communications.

To address these representative deficiencies in the art, what is needed is a capability to deal with ISI in high-speed multilevel communication systems. A further need exists for a DFE that operates in a communication system that conveys data using more than two signal levels. Yet another need exists for a slicer that quantizes multilevel signals to the candidate symbol values with a propagation delay that is small enough to support setting the primary loop delay $\Delta$ in the DFE to the symbol period $T_0$ of the communication system. Such capabilities would reduce ISI effects and facilitate higher bandwidth in numerous communication applications.

SUMMARY OF THE INVENTION

The present invention supports compensating for signal interference, such as ISI, occurring as a result of transmitting a communication signal through a communication channel or over a communication medium to convey digital data. Compensating for interference can improve signal quality and enhance bandwidth or information carrying capability.

A communication system can convey data by transmitting data elements or symbols in a sequential manner, wherein each symbol transmits during a timeframe or symbol period. Each transmitted symbol can be one symbol selected from a finite number of possibilities, for example chosen from a set of binary numbers or other numbers. The waveform of the communication signal during the symbol period can specify the symbol communicated during that symbol period. The waveform can have a specific level or voltage state, selected from a finite number of possibilities corresponding to the communication symbol. Thus, the level of the waveform during a specific symbol period can identify a specific symbol transmitted on that time interval. Transmitting the data over a physical medium, such as in a wire or through the air, can cause the level of the waveform to vary or deviate from the specified level. ISI or signal energy from one symbol period bleeding into another symbol period can cause such deviation. At the receiving end of a communication link, the deviation can impair identifying the symbol that was transmitted. In other words, a transmitter can output a communication signal with a discrete amplitude corresponding to a specific symbol, and a receiver can receive a distorted version of that signal with an amplitude that is between that discrete level and another discrete level corresponding to a different symbol.

In one aspect of the present invention, a signal processing system can process the received communication signal to identify and recover or regenerate the signal level output by the transmitter. That is, a circuit can receive a communication signal that has deviated, drifted, or varied from the amplitude set at the transmitter, process the signal to determine the original amplitude setting, and output a signal having the original amplitude setting. A series, bank, or set of electrical devices, such as comparators, can each compare the received communication signal to a respective reference, such as an electrical voltage or current. Each of these electrical devices or comparators can output a two-state comparison signal. The comparison signal can have a high-voltage (or current) state when the communication signal is above the respective reference and a low-voltage (or current) state when the communication signal is below the reference. A signal adding device, such as a summation node or junction, can provide an output signal comprising a summation of the comparison signals. The output signal can have a level or amplitude set to the discrete value that the transmitter specified at the sending end of the communication link. The signal processing system can process multilevel communication signals, including communication signals that convey digital data via three or more signal levels. The signal processing system can process the communication signal and generate the output signal with a signal delay that is shorter than the symbol period. Thus, the signal processing system can output a result for each symbol in a sequence of symbols. The signal processing system can be a slicer that outputs a sliced signal on a symbol-by-symbol basis.

In another aspect of the present invention, a feedback circuit can process the sliced signal, generate a corrective signal, and apply the corrective signal to the communication signal during subsequent timeframes or symbol periods. So applied, the corrective signal can suppress or eliminate interference imposed on later-arriving symbols. That is, the feedback circuit can estimate the interference that a current symbol imposes on subsequent symbols and apply a delayed correction that coincides with the reception of those subsequent symbols. The feedback circuit can comprise one or more feedback paths, each having a delay device and a scaling device such as an amplifier or attenuator. Each of the feedback paths can generate and store a correction signal to correct interference for a subsequent symbol period. The delay device of each feedback path can delay the sliced signal to provide timing that matches one of the subsequent symbol periods. The scaling device of each feedback path can attenuate the sliced signal to approximate the interference that the current symbol imposes on that subsequent symbol period. The feedback circuit can apply to each incoming symbol period an aggregate correction that comprises each correction signal from each of the feedback paths. The applied correction can suppress interference on each incoming symbol period.

The discussion of processing communication signals and canceling or correcting interference presented in this summary is for illustrative purposes only. Various aspects of the present invention may be more clearly understood and appre-

Figure 1:
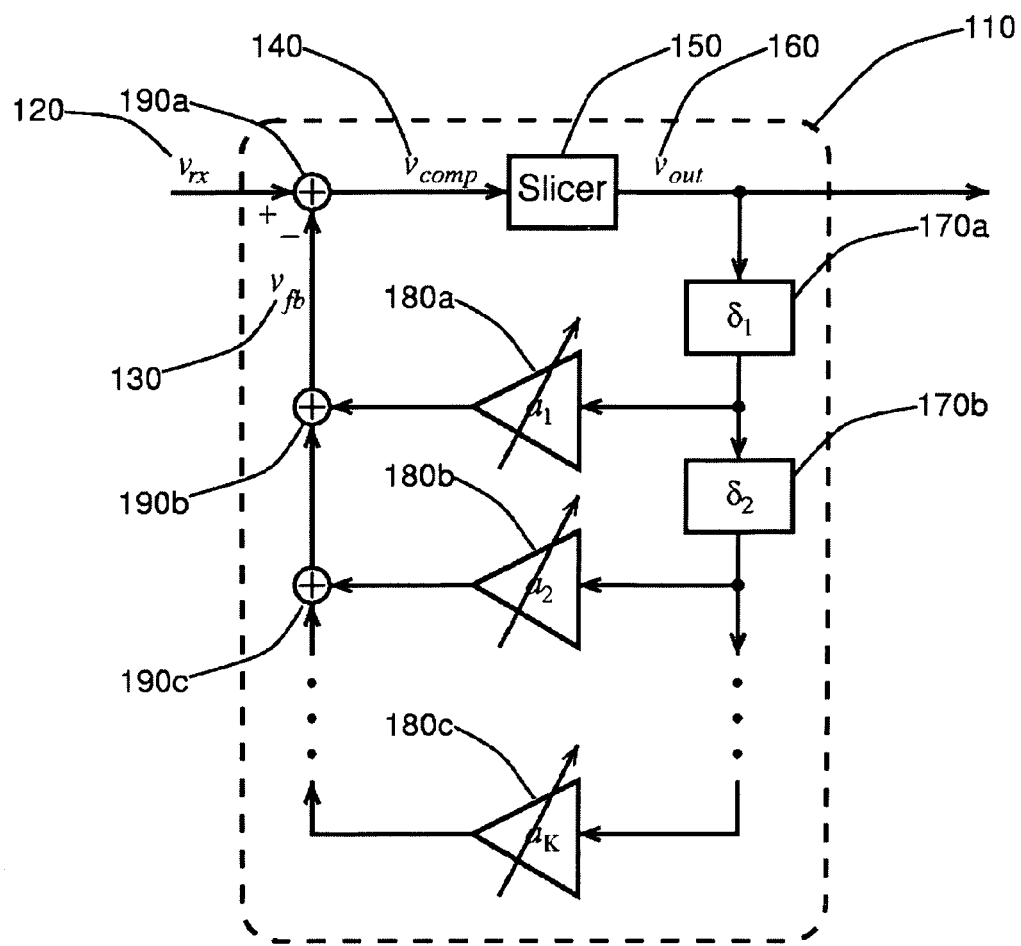
FIG. 1 is a functional block diagram of a conventional DFE.
Figure 2:
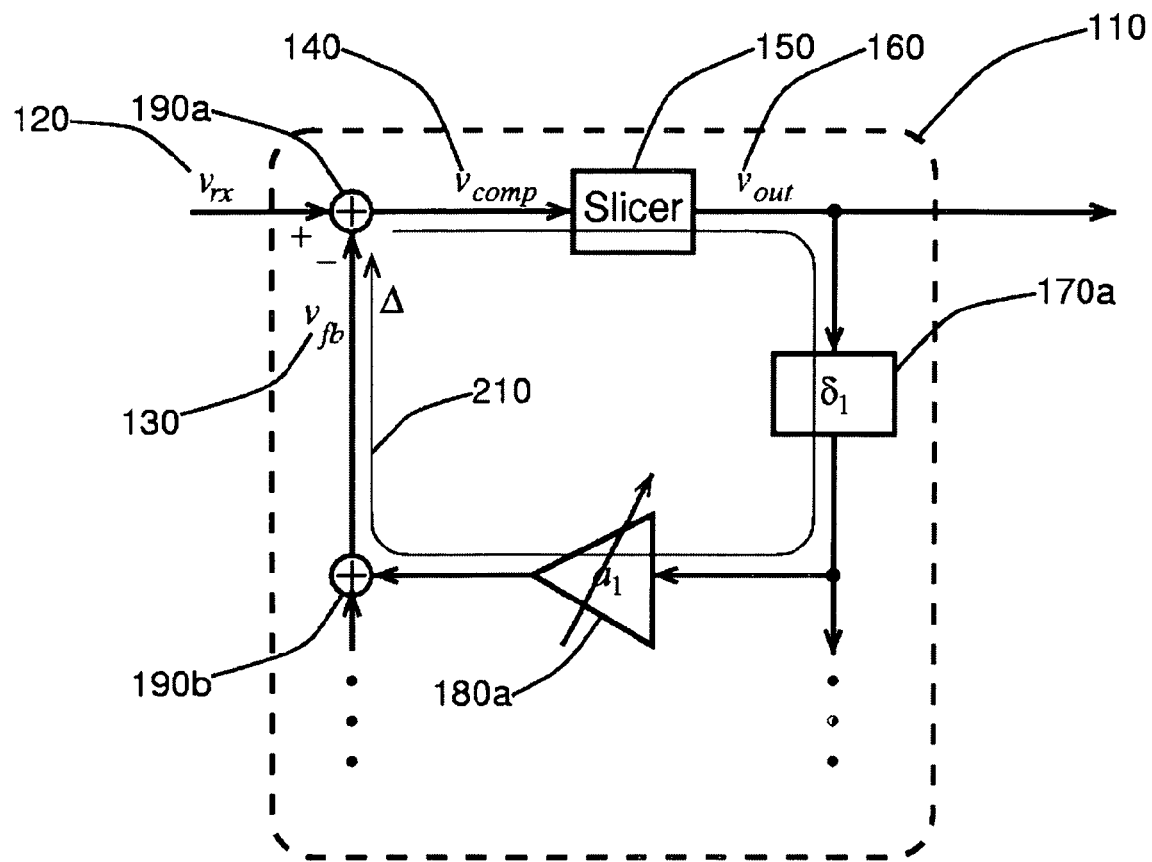
FIG. 2 is an illustration of a feedback loop of the conventional DFE illustrated in FIG. 1.

Many aspects of the invention can be better understood with reference to above-described drawings. The components in the drawings are not necessarily to scale, emphasis instead being placed upon clearly illustrating the principles of exemplary embodiments of the present invention. Moreover, in the drawings, reference numerals designate corresponding parts throughout the several views.

DETAILED DESCRIPTION OF EXEMPLARY EMBODIMENTS

The present invention supports processing a communication signal to address ISI. In an exemplary system and method, a DFE can address ISI by equalizing a multi-level communication signal using a high-speed slicer that operates with a small propagation delay. While an exemplary slicer will be described in the context of a DFE operating environment, the invention can be used in other applications. A variety of applications can benefit from a multilevel slicer that exhibits small or minimal propagation delay.

This invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and among others supported by exemplary embodiments of the present invention.

A multilevel slicer in accordance with an exemplary embodiment of the present invention can comprise an integration of certain elements or functions of a conventional ADC with certain elements or functions of a conventional DAC. In a back-to-back configuration, the ADC elements receive the communication signal and feed the DAC elements, which output a sliced signal.

An ADC can receive an analog communication signal having ISI and output a corresponding digital signal representation of that analog signal. Whereas the input analog signal may have any amplitude within an amplitude range, the digital signal representation has a discrete value selected from a finite number of possibilities. A DAC can receive the digital signal representation and output a corresponding analog signal. That is, the DAC sets the amplitude of its analog signal output to a specific level defined by the digital data. Whereas the amplitude of the analog signal input into the ADC may have essentially any value within an amplitude range, the analog signal output by the DAC has a value selected from a limited number of possibilities. Thus, an ADC-DAC pair can process an analog communication signal of variable amplitude and output an analog signal having a fixed amplitude corresponding to a digital state.

A slicer in accordance with an exemplary embodiment of the present invention can be made by combining the ADC with the DAC and eliminating extraneous, unnecessary, or redundant circuitry of the ADC and the DAC. That is, integrating the ADC and the DAC can include removing select portions of both the ADC and the DAC associated with converting a signal to and from a plurality of binary signals conveying a binary representation of the multilevel signal. A single or monolithic IC chip can result from or embody this integration, for example.

Figure 3:
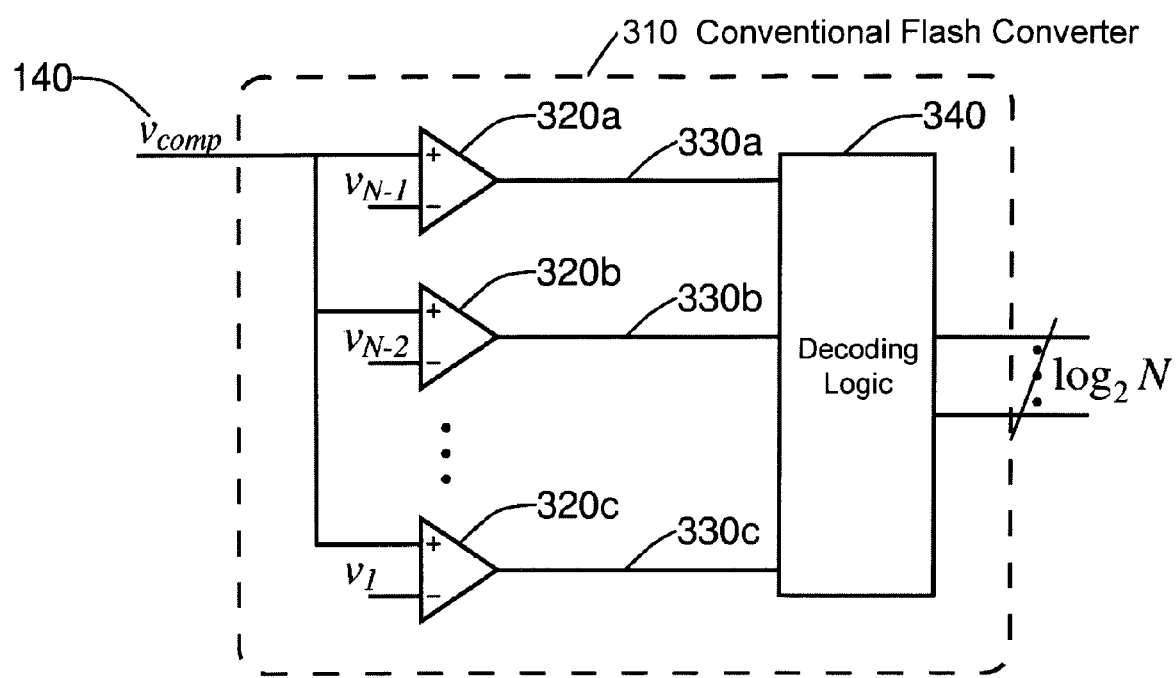
FIG. 3 is a functional block diagram of a conventional flash converter receiving a compensated communication signal.

To better understand creating a slicer by integrating an ADC and a DAC, it will be useful to review the operation of a conventional flash converter, which is a type of ADC. Specifically, certain aspects of a conventional flash converter can serve as an architecture platform for a slicer in accordance with an exemplary embodiment of the present invention. FIG. 3 illustrates a functional block diagram of an exemplary flash converter 310 used to receive a compensated communication signal 140.

The flash converter ADC 310 takes as input the compensated multilevel signal $v_{comp}$ 140. This signal 140 is split and fed to a set of N–1 comparators 320. The term "comparator" as used herein refers to a device that compares an input signal to a reference and outputs a signal 330 based on the comparison. Each comparator 320 has its own distinct threshold level $v_n$ or reference that serves as the decision threshold between signal levels n–1 and n. The set of N–1 comparator outputs 330 thus conveys the signal level, albeit in an over-complete representation, using N–1 bits for each symbol. The outputs 330 of the comparators 320 feed to a decoding logic block 340 that translates the information into a maximally concise binary representation using $\log_2 N$ bits. As will be appreciated by those skilled in the art, more information on flash converters can be found in the conventional art.

One specific embodiment of a flash converter is described in U.S. Pat. No. 6,816,101 by Hietala and Kim, entitled "High-Speed Analog-To-Digital Converter Using a Unique Gray Code," and granted on Nov. 9, 2004. The contents of U.S. Pat. No. 6,816,101 are hereby incorporated by reference.

The decision on the level of the input signal 140 is available from the comparator outputs 330 of the flash converter ADC 310 in FIG. 3. The logic block 340 provides the signal level information in a specific binary representation. While the comparator array 320 provides a function useful for a slicer, the decoding logic can be superfluous for the slicer. Thus, as will be discussed in additional detail below, a slicer can comprise the comparator array 320 or front-end of the conventional flash converter ADC 310. And, the superfluous decoding logic 340 can be eliminated. Since the comparators 320 are arranged in a parallel configuration, the propagation delay through the comparator set 320 is essentially the same as the delay of a single comparator 320a.

The conventional flash converter ADC 310 can be adapted to create a slicer by replacing the decoding logic 340 with a summation node. That is, adding together each of the comparator outputs 330 and bypassing or eliminating the decoding logic block 340 provides a slicing function. As will be discussed in more detail below, FIG. 4 illustrates an exemplary slicer 400 having this configuration.

Figure 4:
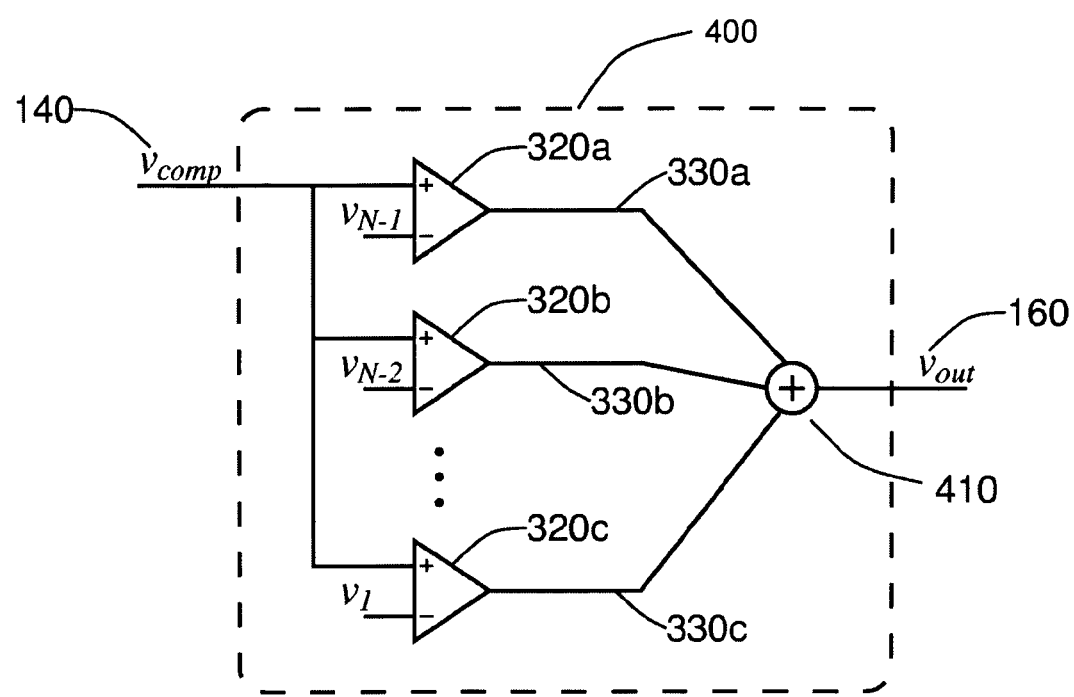
FIG. 4 is a functional block diagram of an exemplary slicer in accordance with an embodiment of the present invention.

Referring now to FIG. 3, a discussion follows of the principles of operation of the flash converter 310, its comparators 320, and the relationships among comparator outputs 330 in the context of creating the slicer 400 that FIG. 4 illustrates.

The parallel comparator set 320 provides information on parallel lines 330 that describes the level of the input signal 140. That is, the set of individual comparator outputs 330a, 330b ... 330c specifies the magnitude of $v_{comp}$ 140 within a level of precision. Whereas the comparator array 320 of the flash converter 310 provides a plurality of N−1 binary signals 330, an exemplary slicer 400 should output a single regenerated multilevel signal.

Thus, the slicer 400 should have circuitry to convert the N−1 bits into a single N-level signal in place of the flash converter's DAC, which conventionally converts a series of $\log_2 N$ bits into a single N-level symbol. The over-completeness of the N−1 bit representation can be advantageous for multilevel signal regeneration. In particular, because the N−1 bit representation is over-complete, there are well-defined dependencies among the N−1 bits, i.e. not all permutations of N−1 bit combinations are valid. The slicer 400 can use this property as an architectural basis.

The thresholds ($v_{N-1}, v_{N-2} \ldots v_1$) on the comparator set 320 in FIG. 3 can be arranged in a monotonic sequence without loss of generality. That is, one can assume that $v_1 < v_2 < \ldots < v_{N-1}$ or could permute the ordering of these reference thresholds to provide an increasing sequence and adjust the decoding logic block 340 accordingly.

Because the same signal $v_{comp}$ 140 feeds all N−1 comparators 320, it follows that if the output of comparator n is "true" (i.e. if $v_{comp} > v_n$), then the output of comparator m is also "true" (i.e. $v_{comp} > v_m$) for all m<n since $v_m < v_n$. A consequence of this property is that if the signal $v_{comp}$ lies between $v_n$ and $v_{n+1}$, i.e. $v_n < v_{comp} < v_{n+1}$, then the outputs of comparators 1 through n are "true" and the outputs of comparators n+1 through N−1 are "false." In other words, in this situation, exactly n of the comparator outputs are "true."

Recognizing that $v_{comp}$ falling between $v_n$ and $v_{n+1}$ can be interpreted as declaring the symbol as level n, it follows that counting the number of "true" comparator outputs 330 obtains the desired regenerated multilevel symbol. In other words, the identity of the multilevel symbol for the input signal 140 corresponds to the number of comparator outputs 330 that are in an "on" or high-voltage state. Thus, the multilevel symbol can be regenerated by summing all the comparator outputs 330. Those skilled in the art will recognize that signal summation can be implemented in a manner that takes negligible time, thereby achieving a desirably small propagation delay.

FIG. 4 illustrates an exemplary slicer 400 configured to sum the comparator outputs 330 in accordance with an exemplary embodiment of the present invention. The comparator output lines 330 feed into a summation node 410 that outputs the sliced signal 160. It may be useful to scale the comparator outputs 330 in order to prevent signal saturation in the summation node 410. Each of the comparator outputs 330a, 330b ... 330c may be attenuated by a common scaling factor, for example. Such attenuation does not detract from the performance of the slicer 400 as the effect is that the multilevel slicer output 160 is also attenuated by the same factor. Furthermore, this scaling can be implemented with simple passive elements that introduce negligible propagation delay.

Thus, in accordance with an exemplary embodiment of the present invention, the multilevel slicer 400 that FIG. 4 illustrates can comprise the front end of a conventional flash converter, specifically a set of N−1 comparators 320. One of the inputs of each comparator 320 couples to the slicer input 140, while the other input of each comparator 320 is tied to a reference or threshold $v_n$. The threshold for the $n^{th}$ comparator $320_n$ is taken as the desired decision threshold between level n−1 and level n of the multilevel signal. The summation node 410 adds the outputs of the N−1 comparators 320 to regenerate the multilevel signal 160. As discussed above, optional attenuation components (not shown) between the output of each comparator 320 and the summation node 410 can prevent signal saturation at the summation node 410.

The delay through the comparator set 320 as a whole is essentially the same as the delay through a single comparator 320a, since the slicer architecture provides a parallel comparator arrangement. Furthermore, the delay through the summation node 410 and any attenuation components can be negligibly small. Thus, the multilevel slicer 400 operates with minimal propagation delay and thereby supports multilevel DFEs with high symbol rates.

It will be appreciated by those skilled in the art that the division of the system 400 into functional blocks, modules, or respective sub-modules as illustrated in FIG. 4 (and similarly the systems illustrated in the other figures discussed herein) is conceptual and does not necessarily indicate hard boundaries of functionality or physical groupings of components. Rather, representation of the exemplary embodiments as illustrations based on functional block diagrams facilitates describing an exemplary embodiment of the present invention. In practice, these modules may be combined, divided, and otherwise repartitioned into other modules without deviating from the scope and spirit of the present invention.

Figure 5:
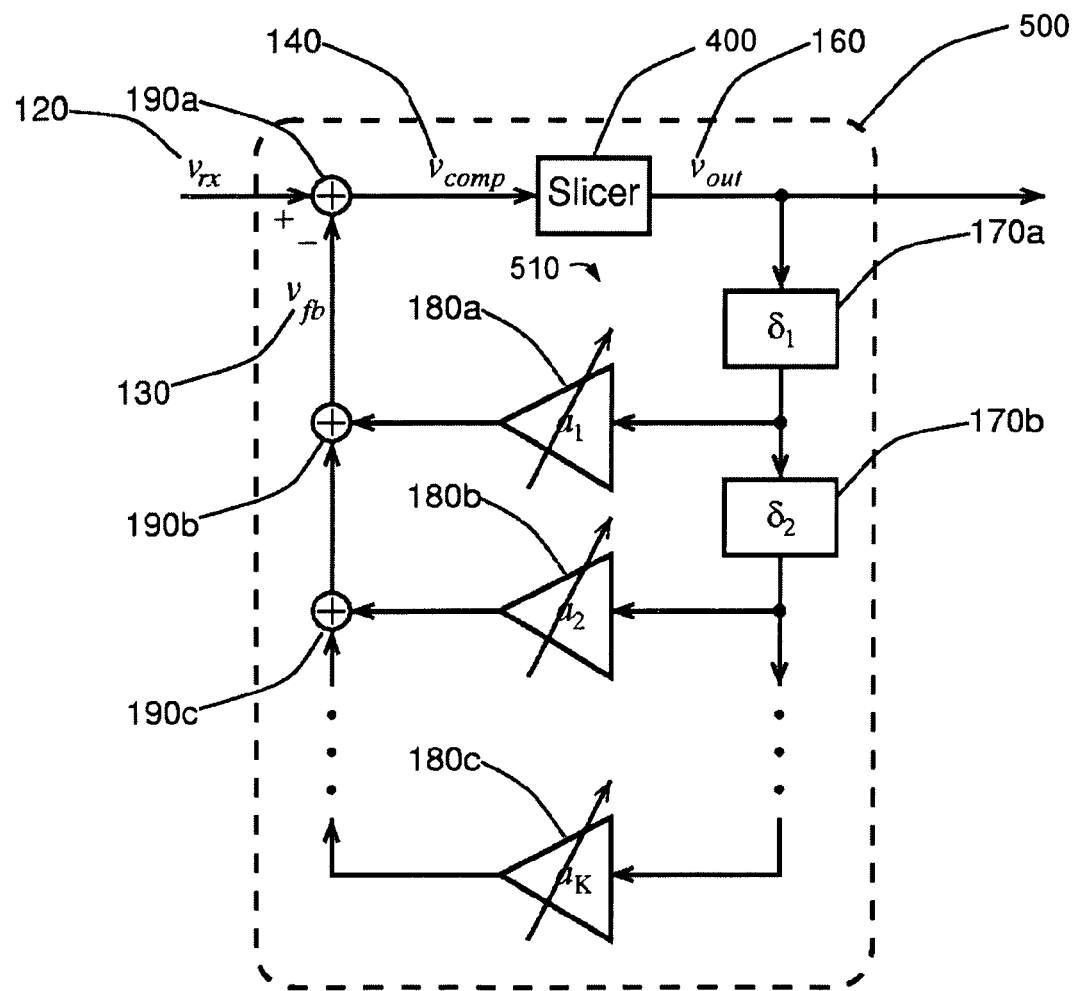
FIG. 5 is a functional block diagram of an exemplary DFE in accordance with an embodiment of the present invention.

Turning now to FIG. 5, this figure illustrates a functional block diagram of an exemplary DFE 500 in accordance with an embodiment of the present invention. The DFE 500 comprises the slicer 400 that is illustrated in FIG. 4 and discussed above. A feedback circuit 510 processes the slicer output 160 to generate ISI compensation 130 in the form of feedback 130 that the summation node 190a applies to the incoming communication signal 120. The feedback circuit 510 adjusts the waveform in each symbol period to compensate for or remove ISI on that portion of the waveform that is due to previously-received symbol periods.

The propagation delay of the slicer 400 is less than or equal to the symbol period. That is, the amount of time between a signal entering and exiting the slicer 400 is less than or equal to the amount of time that each data element of the communication signal 120 occupies. In exemplary embodiments, the communication signal 120 can convey data at a rate exceeding one megabit per second, one gigabit per second, ten gigabits per second, or 100 gigabits per second, or in a range thereof.

The DFE 500 can comprise a conventional DFE 110, as illustrated in FIG. 1 and discussed above, with the slicer 400 replacing the conventional slicer 150. That is, in one exemplary embodiment of the present invention, a conventional DFE 110 or DFE design can be upgraded by removing the conventional slicer 150 and inserting the slicer 400. In addition to the conventional DFE 110 illustrated in FIG. 1 and discussed above, the slicer 400 can be applied to a wide variety of DFE systems, designs, or architectures know to those skilled in the art. Furthermore, a slicer 400 in accordance with an exemplary embodiment of the present invention can enhance performance of other equalizers, equalizing devices, and communication systems.

Figure 6:
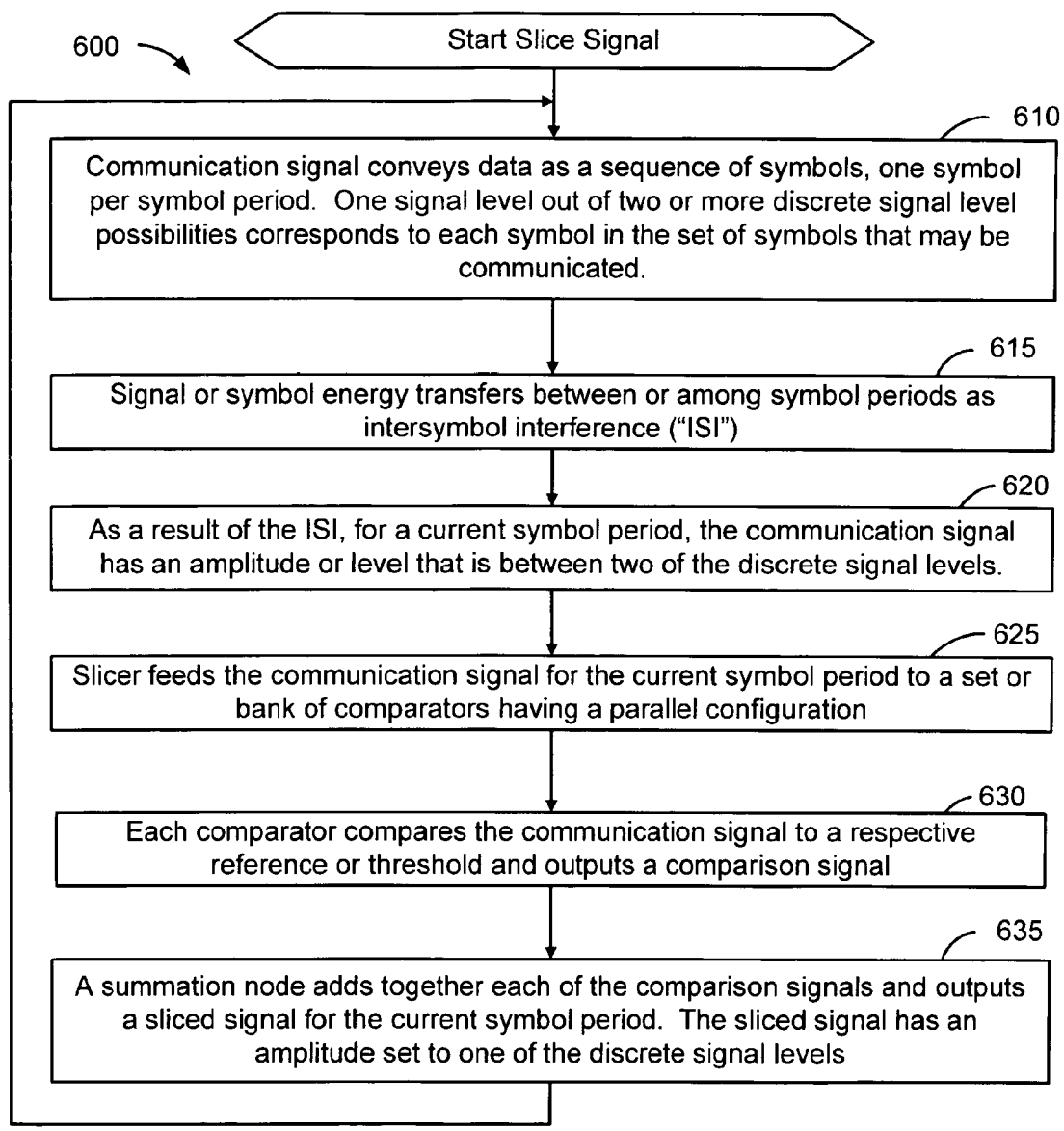
FIG. 6 is a flow chart illustrating an exemplary process for slicing a communication signal in accordance with an embodiment of the present invention.

Turning now to FIG. 6, this figure illustrates a flowchart of an exemplary process 600, entitled Slice Signal, for slicing a communication signal 140 according to an embodiment of the present invention. The steps of Process 600 will be discussed with exemplary reference to the slicing system 400 of FIG. 4, which is discussed above.

Certain steps in this process or the other exemplary processes described herein must naturally precede other steps for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

At Step 610, the first step in Process 600, a communication signal 140 conveys digital information or data in a sequence or series of symbols. Designated timeslots or symbol periods each carry one of the symbols. For each symbol period, a specific signal level, selected from two or more discrete signal level possibilities, identifies or corresponds to the symbol in that symbol period.

At Step 615, the sequence of symbols propagates in a physical medium or communication channel. Energy transfers between or among two or more symbol periods, thus causing ISI that distorts each signal level in each symbol period.

At Step 620, for a current symbol period, the communication signal 140 has an amplitude or level that is between two adjacent levels in the multilevel communication scheme. That is, in response to the ISI or energy transfer, the signal level for the symbol period that arrives at a receiver at a current time has shifted, varied, or deviated from its pre-transmission setting.

At Step 625, circuit traces in the slicer 400 feed the communication signal 140 for the current symbol period to a set, bank, or plurality of comparators 320. The comparators 320 are disposed in a parallel configuration so that each of the comparators 320 processes the communication signal 140 during an overlapping or essentially concurrent timeframe.

At Step 630, each of the comparators 320 compares the communication signal 140 to a respective reference or threshold ($v_{N-1}, v_{N-2} \ldots v_1$). Responsive to the comparisons, each comparator 320 outputs a comparison signal 330 that has one of two states. The comparison signal 330a has a high state or voltage level if the comparator 320a determines that the communication signal 140 is higher than the reference $v_{N-1}$. On the other hand, the comparison signal 330a assumes a low state or voltage level if the comparator 320b determines that the communication signal 140 is lower than the reference $v_{N-1}$.

At Step 635, a summation node 410 or other summing device generates the sliced signal 160 for the current symbol period by summing each of the comparison signals 330. The sliced signal 160 has a level set to one of the two adjacent signal levels. Specifically, the chosen level is the best matching or closest level. Thus, the sliced signal 160 can comprise a regenerated or reconstructed version of a degraded communication signal 140.

Following Step 635, Process 600 iterates Steps 610-635. Thus, Process 600 iteratively processes the communication signal 140 for each incoming symbol period in the symbol series.

Figure 7:
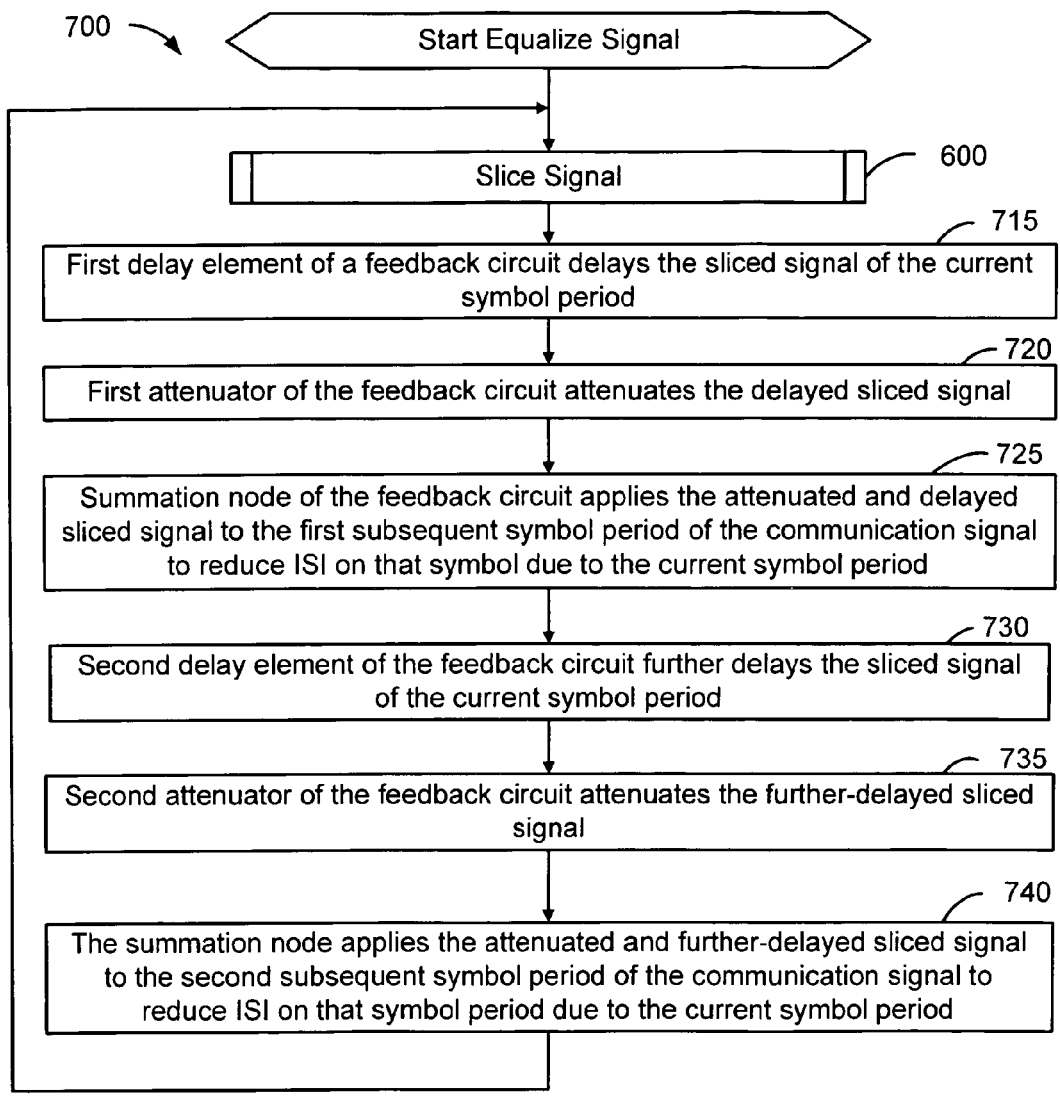
FIG. 7 is a flow chart illustrating an exemplary process for equalizing a communication signal in accordance with an embodiment of the present invention.

Turning now to FIG. 7, this figure illustrates a flowchart of an exemplary process 700, entitled Equalize Signal, for equalizing a communication signal 120 according to an embodiment of the present invention. The steps of Process 700 will be discussed with exemplary reference to the DFE system 500 of FIG. 5, which is discussed above.

The first step in Process 700 is Slice Signal 600, which FIG. 6 illustrates as discussed above. Process 600 outputs a sliced signal 160 having a discrete signal level for a current symbol period.

At Step 715, the first delay element 170a of a feedback circuit 510 delays the sliced signal 160 of the current symbol period. The amount of applied delay results in a timing match between the delayed signal and the next incoming symbol period of the communication signal 120.

At Step 720, the first attenuator or amplifier 180a attenuates or scales the delayed sliced signal. The amount of applied attenuation yields a corrective signal that approximates the ISI imposed on the next incoming symbol period by the signal energy of the current symbol period.

At Step 725, the summation node 190a of the feedback circuit 510 applies the attenuated and delayed sliced signal to the next incoming or first subsequent symbol period of the communication signal 120. This compensation or correction 130 reduces the ISI on that symbol period due to the current symbol period. That is, the applied corrective signal 130 comprises a corrective component produced via the first delay 170a and the first amplifier 180a.

At Step 730, the second delay element 170b of the feedback circuit 510 further delays the sliced signal of the current symbol period. The applied delay provides a timing match between the delayed signal and the second subsequent symbol period.

At Step 735, the second amplifier 180b attenuates the signal output by the second delay element 170b. The applied attenuation yields an amplitude or level that matches or approximates the ISI that the energy in the current symbol period imposes on the second subsequent symbol period.

At Step 740, the summation node 190a applies to the communication signal 120 a corrective component 130 that the second delay element 170b and the second amplifier 180b produce. Specifically, that component of the corrective signal 130 addresses ISI on the second subsequent symbol period due to the energy transfer from the current symbol period. Following Step 740, Process 700 iterates, thus applying ISI correction 130 to the communication signal 120 for each symbol period, on a symbol-by-symbol basis.

Although a system in accordance with the present invention can comprise a circuit that addresses ISI of a communication signal, those skilled in the art will appreciate that the present invention is not limited to this application and that the embodiments described herein are illustrative and not restrictive. Furthermore, it should be understood that various other alternatives to the embodiments of the invention described here may be employed in practicing the invention. The scope of the invention is intended to be limited only by the claims below.

What is claimed is:

1. A method for processing a communication signal comprising a first signal segment that represents a first symbol and that immediately precedes a second signal segment representing a second symbol, the method comprising:

processing the first signal segment with a front end of a flash converter that comprises a plurality of comparators connected to a corresponding plurality of references, each comparator producing a respective output signal, wherein the flash converter comprises the front end coupled to a logic circuit and is modified to form a slicer by replacing the logic circuit with a summation node;

setting a signal to a discrete intensity in response to performing a signal summation of the respective output signals with the summation node;

delaying and scaling the signal; and applying the delayed and scaled signal to the second signal segment to correct interference on the second signal segment, wherein the front end of the flash converter coupled to the summation node form the slicer having a propagation delay that is less than or equal to a symbol period of the communication signal.

2. The method of claim 1, wherein applying the delayed and scaled signal to the second signal segment comprises correcting intersymbol interference.

3. The method of claim 1, wherein applying the delayed and scaled signal to the second signal segment comprises correcting interference that the first signal segment has imposed on the second signal segment.

4. The method of claim 1, wherein the communication signal further comprises a third signal segment that follows the second signal segment, and
wherein the method further comprises the steps of:
processing the second signal segment with the plurality of comparators, each comparator producing a respective second output signal;
generating a second signal in response to summing the respective second output signals;
delaying and scaling the second signal; and
applying the delayed and scaled second signal to the third signal segment to correct interference on the third signal segment.

5. The method of claim 1, wherein a multilevel communication scheme applies consistently to the first signal segment and the second signal segment.

6. The method of claim 1, wherein the plurality of comparators comprises three comparators.

7. The method of claim 1, wherein the first signal segment occupies a first symbol period, and wherein the second signal segment occupies a second symbol period.

8. The method of claim 1, wherein the first signal segment comprises an amplitude that deviates substantially from every level of a multilevel communication scheme that applies to the first signal segment and that applies to the second signal segment.

9. A method for processing a communication signal, comprising:
comparing, using a front end of a flash converter that comprises a plurality of comparators, a first symbol of the communication signal with a plurality of reference voltages, each comparator producing a respective output signal,
wherein the flash converter comprises the front end coupled to a logic circuit, and
wherein the flash converter is modified to form a slicer by substituting the logic circuit of the flash converter with a summation node;
feeding the respective outputs into the summation node that performs a signal summation of the respective output signals to generate a signal comprising a sum of discrete values of a multilevel signaling scheme;
delaying and scaling the signal in a plurality of feedback loops; and
applying the delayed and scaled signal to a second symbol of the communication signal to correct intersymbol interference on the second symbol.

10. The method of claim 9, wherein applying the delayed and scaled signal to the second symbol comprises correcting interference that the first symbol has imposed on the second symbol.

11. The method of claim 9, wherein the communication signal further comprises a third symbol that follows the second symbol, and
wherein the method further comprises the steps of:
comparing, by the plurality of comparators, the second symbol with the plurality of reference voltages, each comparator producing a respective second output signal;
summing the respective second output signals to generate a second signal comprising a sum of discrete values of the multilevel signaling scheme;
delaying and scaling the second signal in the plurality of feedback loops; and
applying the delayed and scaled second signal to the third symbol to correct interference on the third symbol.

12. The method of claim 9, wherein the multilevel signaling scheme applies consistently to the first and second symbols.

13. The method of claim 9, wherein the plurality of comparators comprises three comparators.

14. The method of claim 9, further comprising scaling the respective output signals of the plurality of comparators before the summing to prevent signal saturation at the summation node.

15. The method of claim 9, wherein delaying and scaling the signal comprises respectively delaying and scaling the signal in each of the plurality of feedback loops.

16. The method of claim 9, further comprising setting an amount of scaling, respectively, for each of the plurality of feedback loops.

17. A method for processing a communication signal having a plurality of symbols, comprising:
during a time period less than or equal to a symbol period of the plurality of symbols, comparing, by a plurality of comparators that are arranged as a front end of a flash converter, a symbol of the communication signal with a plurality of reference voltages, each comparator producing a respective output signal having a respective amplitude, and summing the respective amplitudes at a summation node coupled to the plurality of comparators arranged as the front end to generate a signal comprising a sum of discrete values of a multilevel signaling scheme,
wherein the flash converter comprises the front end coupled to a logic circuit, and
wherein the flash converter is adapted to form a slicer by substituting the logic circuit of the flash converter with the summation node;
delaying and scaling the signal in a plurality of feedback loops; and
applying the delayed and scaled signal to a second symbol of the communication signal to correct intersymbol interference on the second symbol.

18. The method of claim 17, wherein applying the delayed and scaled signal to the second symbol comprises correcting interference that the first symbol has imposed on the second symbol.

19. The method of claim 17, wherein the communication signal further comprises a third symbol that follows the second symbol, and
wherein the method further comprises the steps of:
comparing, by the plurality of comparators, the second symbol with the plurality of reference voltages, each comparator producing a respective second output;
summing the respective second outputs to generate a second signal comprising a sum of discrete values of the multilevel signaling scheme;
delaying and scaling the second signal in the plurality of feedback loops; and applying the delayed and scaled second signal to the third symbol to correct interference on the third symbol.

20. The method of claim 17, further comprising scaling the respective amplitudes of the plurality of comparators before the summing to prevent signal saturation.

21. The method of claim 17, wherein delaying and scaling the signal comprises respectively delaying and scaling the signal in each of the plurality of feedback loops.

22. The method of claim 17, further comprising setting an amount of scaling, respectively, for each of the plurality of feedback loops.

\* \* \* \* \*